C. C. KESTER AND C. F. GILCHRIST.
DYNAMO ELECTRIC MACHINE.
APPLICATION FILED JUNE 25, 1917.
1,319,225. Patented Oct. 21, 1919.
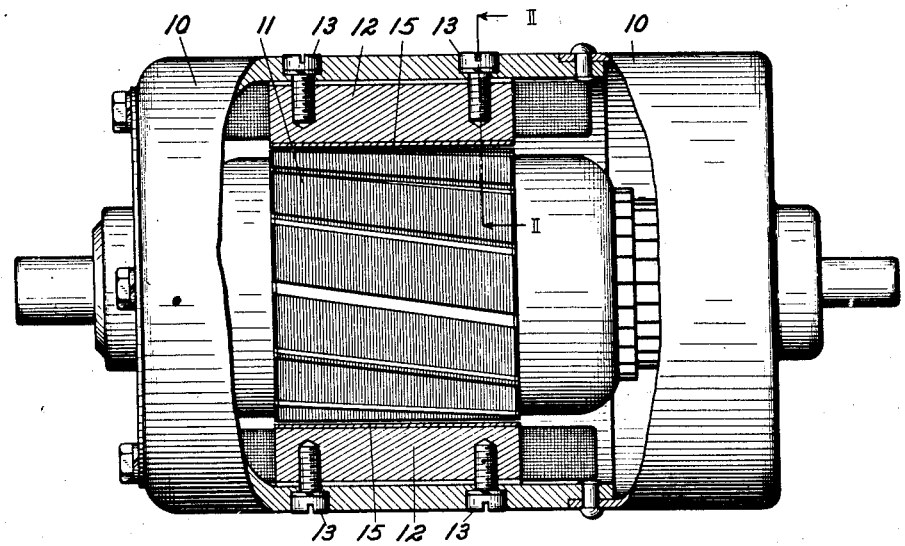
Fig. I.
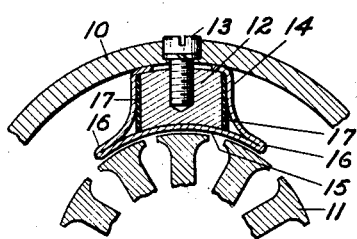
Fig. II.
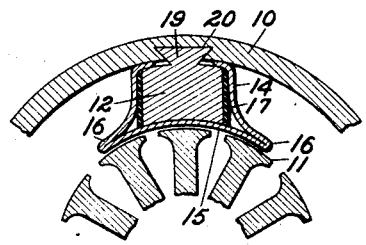
Fig. III.
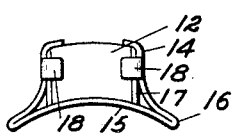
Fig. IV.
Inventors
Charles C. Kester
Clarence F. Gilchrist
By Chester H. Braselton
Attorney

UNITED STATES PATENT OFFICE.

CHARLES C. KESTER AND CLARENCE F. GILCHRIST, OF TOLEDO, OHIO, ASSIGNORS TO ELECTRIC AUTO-LITE CORPORATION, OF TOLEDO, OHIO, A CORPORATION OF DELAWARE.

DYNAMO-ELECTRIC MACHINE.

1,319,225.  Specification of Letters Patent.  Patented Oct. 21, 1919.

Application filed June 25, 1917. Serial No. 176,754.

*To all whom it may concern:*

Be it known that we, CHARLES C. KESTER and CLARENCE F. GILCHRIST, citizens of the United States, residing at Toledo, in the county of Lucas and State of Ohio, have invented certain new and useful Improvements in Dynamo-Electric Machines, of which we declare the following to be a full, clear, and exact description.

This invention relates to improvements in dynamo-electric machines and more particularly to improvements in the construction of field poles for such machines.

The principal object of this invention is to provide an improved field pole construction, which will reduce the distortion of the field and, consequently, sparking at the brushes.

A further object of this invention is to provide an improved field pole construction which will compel the magnetic flux to enter the armature by the shortest path, thus rendering the magnetic field more intense.

Further objects, and objects relating to economies of manufacture and details of construction, will definitely appear from the detailed description to follow.

We accomplish the objects of our invention by the devices and means described in the following specification. Our invention is clearly defined and pointed out in the appended claims.

A structure, constituting a preferred embodiment of our invention, is illustrated in the accompanying drawings, forming a part of this specification, in which:

Figure I is a view in side elevation of a machine embodying our invention, a portion of the casing of said machine being broken away and the field poles being shown in section to illustrate the construction more clearly.

Fig. II is a detail fragmentary, sectional view, taken substantially on the line II—II of Fig. I.

Fig. III is a detail, fragmentary, sectional view, corresponding to Fig. II but showing a different manner of securing the field pole in place relative to the casing.

Fig. IV is an end view of one of the field poles, showing the manner of securing the metal shoe in place upon the field pole core.

In the drawings, similar reference numerals refer to similar parts throughout the several views, and the sectional views are taken looking in the direction of the little arrows at the ends of the section lines.

Considering the numbered parts of the drawing, we have shown a dynamo electric machine comprising a casing 10 and an armature 11. The field poles are secured to the casing 10 in any suitable manner and each of said field poles comprises a core 12, which we have here shown as a solid bar of magnetic material, but which may be laminated, which core is preferably secured to the casing by means of screws 13 passing through the wall of the casing and threaded into said core. Said magnetic core 12 carries a metallic shoe 14, which is made of sheet metal and folded around the solid magnetic core, to provide the concave face 15 adjacent the armature, which is formed on the arc of a circle concentric with the center of the armature. The metal shoe is folded back against the sides of the core, forming ears 16, and the upper edges of said metal shoe are folded over and disposed between the casing 10 and the top of the core 12, as clearly appears from Figs. II and III. Strips 17 of non-magnetic material, such, for instance, as fiber are disposed between the sides of the core 12 and the metal shoe. At each end of the shoe there are provided ears 18, which are bent over and engage the ends of the core 12 to prevent shifting of the shoe relative to the core. In Fig. III we have shown a different manner of securing the field pole in place and, in this form, the casing is provided with a dovetailed slot 20 in which the dove-tailed key 19, formed in the top of the core 12 fits, any suitable means being provided for preventing longitudinal movement of the core relative to the casing. This method of securing the core in place relative to the casing, however, forms no part of the invention.

From the description of the parts given above, the operation of this structure should be very readily understood. When the armature is energized it sets up a cross flux in the field poles and until the field flux reaches the point of magnetic saturation there is a distortion of the magnetic field which produces sparking at the brushes. It is highly desirable to limit this field distortion as much as possible, in order to reduce this sparking at the brushes and to render extensive brush adjustment unnecessary. Since we have provided, at each side of the core 12, the strips 17 of non-magnetic material, the magnetic cross-flux, which is set up in the core 12, is largely limited to that core and, as a result, the point of magnetic saturation will be reached much sooner than would be the case if the strip 17 were of magnetic material and the distortion of the field will be limited. On the other hand, the metal shoe being provided with a concave face 15 which is wider than the width of the core 12, provides a surface presented to the armature so that a large number of lines of magnetic force are cut by the armature. Furthermore, the field-pole construction, which we have here shown, compels the magnetic flux from the field pole to enter the armature by the shortest path, that is, by a path as nearly radial to the armature as possible, with the result that the magnetic field is more intense than would be the case if a field pole was used which was solid throughout and of the cross section of the shoe.

We have shown a solid core 12, but it may very well be made up of a plurality of laminæ of magnetic material without departing from the spirit of our invention. The ears 18 on the ends of the shoe are turned over and engage the ends of the core 12 to prevent shifting of the shoe relative to the core. In Figs. II and III, we have shown two different methods of securing the core relative to the casing, but the particular method used to hold the field core in place forms no part of our invention.

We are aware that the particular embodiment of our invention here shown and described is susceptible of considerable variation without departing from the spirit of our invention, but we have found that this particular embodiment is desirable from many standpoints, and, therefore, we desire to claim our invention specifically and broadly as indicated by the appended claims.

Having thus described our invention, what we claim as new and desire to secure by Letters Patent is—

1. In a machine of the class described, a field pole comprising a core of magnetic material; a strip of non-magnetic material at each side of said core; and a sheet metal shoe provided on said core and having a concave face to be presented to the armature, said shoe being folded back from the side edges of said face, and engaging said non-magnetic strip, and ears formed on the ends of said shoe and engaging the ends of said core to prevent shifting of said shoe relative to said core.

2. In a machine of the class described, a field pole comprising a core of magnetic material; a strip of non-magnetic material at each side of said core; and a sheet metal shoe surrounding said core and having a concave face to be presented to the armature, the metal of said shoe being folded back from the side edges of said face and engaging the said non-magnetic strips.

3. In a machine of the class described, a field pole comprising a core of magnetic material, non-magnetic material at each side of said core, and a metallic shoe surrounding said core and having a concave face to be presented to the armature.

4. In a machine of the class described, a field pole comprising a core of magnetic material, and a metallic shoe surrounding said core, and magnetically insulated from the sides thereof.

5. In a dynamo-electric machine having an armature, a casing, a field pole comprising a core and a sheet metal shoe, said shoe having a concave face presented to the armature and extending from said concave face along the sides of the core and between the core and the casing, and means for securing the core to the casing.

6. In a dynamo-electric machine having a casing and armature, a field pole comprising a core of magnetic material, and a sheet metal shoe, said shoe extending around said core and having tips extending beyond the sides of the core, and means for securing said shoe to said core intermediate the armature face and the casing.

7. In a dynamo-electric machine having an armature, a field pole comprising a core of magnetic material and a sheet metal shoe of magnetic material, said shoe extending around said core, and folded upon itself at the corners between the sides and armature face to form shoe tips.

8. In a machine of the class described, a field pole comprising a core of magnetic material and a metallic shoe of magnetic material, said shoe extending around said core, the sides of the shoe being separated from the core.

9. In a dynamo-electric machine having an armature, a field pole comprising a core of magnetic material, a shoe therefor having an armature face and sides extending along the sides of the core, and means for excluding the magnetic cross flux from the sides to the shoe.

In testimony whereof we affix our signatures.

CHARLES C. KESTER.
CLARENCE F. GILCHRIST.